US011909311B2

(12) United States Patent
Zhou et al.

(10) Patent No.: US 11,909,311 B2
(45) Date of Patent: *Feb. 20, 2024

(54) POWER CONVERTER, INDUCTOR ELEMENT AND CONTROL METHOD OF PHASE SHEDDING

(71) Applicant: Delta Electronics (Shanghai) CO., LTD, Shanghai (CN)

(72) Inventors: Jinping Zhou, Shanghai (CN); Min Zhou, Shanghai (CN); Zhangnan Xin, Shanghai (CN); Xinjian Zou, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 705 days.

This patent is subject to a terminal disclaimer.

(21) Appl. No.: 17/015,154

(22) Filed: Sep. 9, 2020

(65) Prior Publication Data

US 2020/0403499 A1 Dec. 24, 2020

Related U.S. Application Data

(63) Continuation of application No. 15/928,129, filed on Mar. 22, 2018, now Pat. No. 10,819,227.

(30) Foreign Application Priority Data

May 5, 2017 (CN) .......................... 201710313117.9

(51) Int. Cl.
*H02M 3/158* (2006.01)
*H02M 1/14* (2006.01)
(Continued)

(52) U.S. Cl.
CPC ................ *H02M 3/04* (2013.01); *H01F 3/14* (2013.01); *H01F 27/306* (2013.01); *H01F 27/38* (2013.01);
(Continued)

(58) Field of Classification Search
CPC .......... H01F 3/14; H01F 27/38; H01F 27/306; H01F 27/24; H01F 27/28; H02M 3/1584–1586
See application file for complete search history.

(56) References Cited

U.S. PATENT DOCUMENTS 4,384,321 A * 5/1983 Rippel ................ H02M 3/1584
363/124
5,568,111 A 10/1996 Metsler
(Continued)

FOREIGN PATENT DOCUMENTS

CN 1637969 A 7/2005
CN 102314998 A * 1/2012 ............... H01F 3/14
(Continued)

OTHER PUBLICATIONS

Final Rejection dated Jan. 24, 2023 of U.S. Appl. No. 16/735,715.
(Continued)

*Primary Examiner* — Sisay G Tiku
(74) *Attorney, Agent, or Firm* — Qinghong Xu

(57) ABSTRACT

An N-phase power converter has N phases with outputs connected in parallel and outputs connected in parallel. The converter comprises: N switch units, wherein each phase of the N-phase power converter comprises one of the N switch units; and an integrated inductor unit, comprising M inductor subunits, wherein M is a natural number greater than or equal to 2, each inductor subunit comprises i inductors, i is a natural number greater than or equal to 2, N>M×i or N=M×i, M×i of the inductors in the integrated inductor unit are respectively coupled to M×i of the N switch units, wherein: the i inductors of each of the inductor subunit are inverse-coupled to each other, the coupling coefficient
(Continued)

between the M inductor subunits is less than the coupling coefficient between the i inductors in each of the inductor subunits.

12 Claims, 32 Drawing Sheets

(51) Int. Cl.
| | |
|---|---|
| *H02M 1/00* | (2006.01) |
| *H01F 27/38* | (2006.01) |
| *H01F 37/00* | (2006.01) |
| *H01F 3/14* | (2006.01) |
| *H02M 3/04* | (2006.01) |
| *H01F 27/30* | (2006.01) |
| *H01F 27/24* | (2006.01) |
| *H01F 27/28* | (2006.01) |

(52) U.S. Cl.
CPC .......... *H01F 37/00* (2013.01); *H02M 3/1584* (2013.01); *H01F 27/24* (2013.01); *H01F 27/28* (2013.01); *H02M 1/0038* (2021.05); *H02M 1/0048* (2021.05); *H02M 1/0064* (2021.05); *H02M 1/14* (2013.01); *H02M 3/1586* (2021.05)

(56) References Cited

U.S. PATENT DOCUMENTS

| | | | | |
|---|---|---|---|---|
| 6,362,986 | B1* | 3/2002 | Schultz | H02M 3/158 363/132 |
| 7,199,695 | B1* | 4/2007 | Zhou | H01F 37/00 336/212 |
| 7,898,379 | B1* | 3/2011 | Stratakos | H01F 3/00 336/200 |
| 10,186,950 | B2* | 1/2019 | Wolf | H01F 27/24 |
| 10,438,736 | B2* | 10/2019 | Zhou | H01F 27/292 |
| 10,819,227 | B2* | 10/2020 | Zhou | H01F 37/00 |
| 11,605,495 | B2* | 3/2023 | Xiong | H02M 3/1584 |
| 2001/0030595 | A1 | 10/2001 | Hamatani et al. | |
| 2004/0183645 | A1 | 9/2004 | Takaya et al. | |
| 2008/0067990 | A1* | 3/2008 | Wei | H01F 27/2804 336/212 |
| 2008/0180077 | A1* | 7/2008 | Qiu | H02M 3/1584 323/282 |
| 2008/0265858 | A1* | 10/2008 | Muratov | H02M 3/1584 323/301 |
| 2008/0315982 | A1* | 12/2008 | Wei | H02M 7/003 336/155 |
| 2011/0148560 | A1 | 6/2011 | Ikriannikov et al. | |
| 2012/0008286 | A1 | 1/2012 | Suzuki | |
| 2012/0049994 | A1* | 3/2012 | Joo | H01F 17/04 336/233 |
| 2014/0266552 | A1* | 9/2014 | Silva | H01F 27/306 29/606 |
| 2015/0235753 | A1 | 8/2015 | Chatani et al. | |
| 2015/0235754 | A1* | 8/2015 | Ikriannikov | H01F 27/263 336/212 |
| 2016/0020013 | A1 | 1/2016 | Berdy et al. | |
| 2016/0300658 | A1* | 10/2016 | Wu | H01F 27/24 |
| 2016/0300659 | A1 | 10/2016 | Zhang et al. | |
| 2016/0307690 | A1 | 10/2016 | Madsen et al. | |
| 2017/0178794 | A1 | 6/2017 | Yan et al. | |
| 2017/0250025 | A1* | 8/2017 | Wei | H01F 41/069 |
| 2018/0061560 | A1* | 3/2018 | Wukovits | H02M 3/24 |
| 2018/0122562 | A1* | 5/2018 | Ji | H05K 1/185 |
| 2018/0204666 | A1* | 7/2018 | Zhou | H01F 27/29 |
| 2018/0323147 | A1 | 11/2018 | Kirby | |
| 2018/0323702 | A1* | 11/2018 | Zhou | H01F 27/38 |
| 2018/0336986 | A1* | 11/2018 | Xin | H01F 17/06 |
| 2019/0052171 | A1* | 2/2019 | Kitamoto | B60L 58/40 |
| 2019/0108939 | A1 | 4/2019 | Fujimoto et al. | |
| 2019/0122814 | A1* | 4/2019 | Hung | H01F 27/24 |
| 2019/0172629 | A1* | 6/2019 | Zhou | H01F 27/29 |
| 2019/0189334 | A1 | 6/2019 | Miyashita et al. | |
| 2019/0214181 | A1 | 7/2019 | Wang et al. | |
| 2019/0252114 | A1* | 8/2019 | Lu | H01F 3/14 |
| 2019/0385775 | A1 | 12/2019 | Roth et al. | |
| 2020/0219647 | A1* | 7/2020 | Ji | H01F 27/303 |
| 2020/0219648 | A1* | 7/2020 | Ji | H01F 27/255 |
| 2021/0210472 | A1* | 7/2021 | Ji | H01L 23/562 |
| 2021/0350969 | A1* | 11/2021 | Ji | H01F 27/306 |
| 2022/0158558 | A1* | 5/2022 | Ikriannikov | H01F 27/306 |
| 2022/0158562 | A1* | 5/2022 | Yang | H02M 3/1586 |
| 2022/0351898 | A1* | 11/2022 | Wang | H02M 3/1586 |
| 2023/0085737 | A1* | 3/2023 | Yang | H01F 27/2823 336/5 |

FOREIGN PATENT DOCUMENTS

| | | | | |
|---|---|---|---|---|
| CN | 103081325 | A | 5/2013 | |
| CN | 105810406 | A | 7/2016 | |
| CN | 205752461 | U | 11/2016 | |
| CN | 107452481 | A | 12/2017 | |
| CN | 207274460 | U * | 4/2018 | |
| CN | 108492965 | A | 9/2018 | |
| CN | 108648902 | A * | 10/2018 | ............. H01F 27/08 |
| EP | 1168384 | A1 * | 1/2002 | ......... H01F 27/2847 |
| EP | 1168384 | A1 | 1/2002 | |
| EP | 1835604 | A1 * | 9/2007 | ............. H01F 27/24 |
| JP | H11340085 | A | 12/1999 | |
| JP | 2007171159 | A | 7/2007 | |
| JP | 2012060796 | A * | 3/2012 | |
| JP | 2012152104 | A | 8/2012 | |
| TW | 200402812 | A | 2/2004 | |
| TW | 201837934 | A | 10/2018 | |
| WO | 2008139393 | A1 | 11/2008 | |
| WO | 2018012059 | A1 | 1/2018 | |
| WO | 2018043318 | A1 | 3/2018 | |
| WO | 2018190075 | A1 | 10/2018 | |
| WO | WO-2021211682 | A1 * | 10/2021 | ............. H01F 27/06 |

OTHER PUBLICATIONS

1st Office Action dated Nov. 3, 2022 of Chinese Application No. 201910796711.7.
Non-Final Office Action dated May 25, 2023 of U.S Appl. No. 17/015,154.
2nd Office Action dated Jul. 1, 2023 of Chinese Application No. 201910796711.7.
Non-Final Office Action dated Sep. 14, 2023 of U.S. Appl. No. 16/735,657.
Oral hearing dated Oct. 12, 2023 of Indian Application No. 201724037596.

* cited by examiner

POWER CONVERTER, INDUCTOR ELEMENT AND CONTROL METHOD OF PHASE SHEDDING

CROSS-REFERENCE TO RELATED APPLICATIONS

The present disclosure is continuation of U.S. application Ser. No. 15/928,129 which is based upon and claims priority to Chinese Patent Application 201710313117.9, filed on May 5, 2017, the entire contents of which are incorporated herein by reference.

TECHNICAL FIELD

The present disclosure relates to a power converter, an inductor element, and a control method of phase shedding, and more particularly, to a power converter, an inductor element, and a control method of phase shedding which are capable of improving the performance of the converter.

BACKGROUND

In recent years, with the development of technologies such as data center, artificial intelligence and the like, CPUs, GPUs and various integrated circuits (ICs) have higher speed and larger operating current. Stricter requirement is imposed to the power density, efficiency and dynamic performance of the voltage regulating module (VRM), and makes a greater challenge to the design of the VRM. In the voltage regulation module, the output inductor usually has great volume, and the selection of the inductance would directly affect the efficiency and dynamic performance of the entire VRM.

In order to solve these problems, proposals have been made to reduce the inductor volume, improve the efficiency and the dynamic performance by using inverse-coupled inductor in the converter. However, conventional inverse-coupled inductor has the disadvantages of increased leakage inductance, decreased saturation characteristics and poor dynamic performance when it is in a phase shedding mode at light load. The present disclosure is provided for solving some of the problems of the conventional inverse-coupled inductor.

It should be noted that, information disclosed in the above background portion is provided only for better understanding of the background of the present disclosure, and thus it may contain information that does not form the prior art known by those ordinary skilled in the art.

SUMMARY

The embodiments of the present disclosure provide a power converter, an inductor element, and a phase shedding control method. The technical solutions are as follows:

According to a first aspect of the present disclosure, there is provided an N-phase power converter, wherein N is a natural number greater than 3, inputs of each phase of the N-phase power converter are connected in parallel, outputs of each phase of the N-phase power converter are connected in parallel, and the N-phase power converter comprises:
  N switch units, wherein each phase of the N-phase power converter comprises one of the N switch units; and
  an integrated inductor unit, comprising M inductor subunits, wherein M is a natural number greater than or equal to 2, each of the M inductor subunit comprises i inductors, i is a natural number greater than or equal to 2, N>M×i or N=M×i, and the M×i inductors in the integrated inductor unit are respectively coupled to M×i of the N switch units, wherein:
  the i inductors of each of the same inductor subunit are inverse-coupled to each other, and a coupling coefficient between the M inductor subunits is less than a coupling coefficient between the i inductors in the same inductor subunits.

According to a second aspect of the present disclosure, there is provided an N-phase integrated inductor element, wherein N is a natural number greater than 3, the integrated inductor element comprises M inductor subunits, M is a natural number greater than or equal to 2, each of the M inductor subunit comprises at least i inductors, i is a natural number greater than or equal to 2, and N>M×i or N=M×i, wherein:
  the i inductors of the same inductor subunit are coupled to each other, a coupling coefficient between the M inductor subunits is less than a coupling coefficient between the i inductors within the same inductor subunit.

According to a third one of the present disclosure, there is provided a control method of phase shedding for an N-phase power converter according to the first aspect of the present disclosure, the control method of phase shedding comprising:
  controlling y×i switch units coupled with y×i inductors of y inductor subunits in the M inductor subunits to be turned off, wherein 0<y<M, so as to shed the y inductor subunits; and
  controlling the (M−y)×i inductors of other M−y inductor subunits to have a phase difference of $360°/[(M−y)×i]$.

It is to be understood that both the foregoing general description and the following detailed description are exemplary and explanatory only and are not restrictive of the disclosure.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

FIG. 5b schematically shows the structure of the core of the integrated inductor unit shown in FIG. 5a;

FIG. 5c schematically shows the magnetic flux distribution of the integrated inductor unit shown in FIG. 5a;

FIG. 6b schematically shows an exploded view of the structure of the integrated inductor unit shown in FIG. 6a;

FIG. 6c schematically shows a side view of the integrated inductor unit shown in FIG. 6a.

FIG. 6d schematically shows a sectional view of the integrated inductor unit taken along the line AN in FIG. 6a;

FIG. 7b schematically shows the magnetic flux distribution of the integrated inductor unit shown in FIG. 7a;

FIG. 8b schematically shows an exploded view of the structure of the integrated inductor unit shown in FIG. 8a;

FIG. 8c schematically shows a side view of the integrated inductor unit shown in FIG. 8a;

FIG. 8d schematically shows a cross-sectional view of the integrated inductor unit taken along the line AA in FIG. 8a;

FIG. 9b schematically shows the magnetic flux distribution of the integrated inductor unit shown in FIG. 9a;

FIG. 10b schematically shows a bottom view of the integrated inductor unit shown in FIG. 10a;

FIG. 10c schematically shows a top view of the integrated inductor unit shown in FIG. 10a;

FIG. 10d schematically shows the structure of the core of the integrated inductor unit shown in FIG. 10a;

FIG. 10e schematically shows a sectional view of the integrated inductor unit taken along the line AA' in FIG. 10a;

FIG. 11b schematically shows the magnetic flux distribution of the integrated inductor unit shown in FIG. 11a;

FIG. 15b schematically shows the structure of the core of the integrated inductor unit shown in FIG. 15a;

FIG. 15c schematically shows the magnetic flux distribution of the integrated inductor unit shown in FIG. 15a.

Through the above-mentioned drawings, particular embodiments of the present disclosure have been shown and will be described in more detail later. These drawings and textual descriptions are not intended to limit the scope of the inventive concept in any way, but rather to explain those skilled in the art the concepts of the present disclosure by referring to specific embodiments.

DETAILED DESCRIPTION

Exemplary embodiments will be described in detail herein, examples of which are illustrated in the accompanying drawings. When the following description refers to the accompanying drawings, the same numerals in different drawings denote the same or similar elements unless otherwise indicated. The implementations described in the following example embodiments do not represent all implementations consistent with the present disclosure. Rather, they are merely examples of apparatus and methods consistent with some aspects of the disclosure, as set forth in the appended claims.

Figure 1:
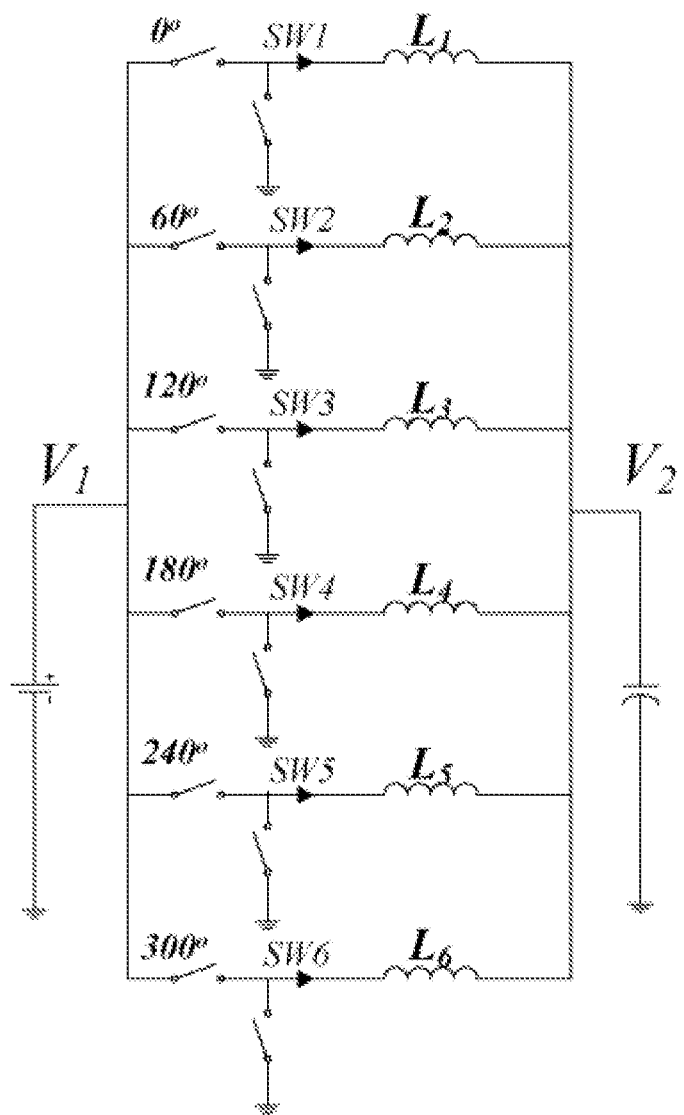
FIG. 1 schematically shows a schematic diagram of a multiphase parallel-connected DC-DC converter using discrete inductors, FIG. 2 schematically shows a schematic diagram of a multiphase parallel-connected DC-DC converter using inverse-coupling inductors.
Figure 2:
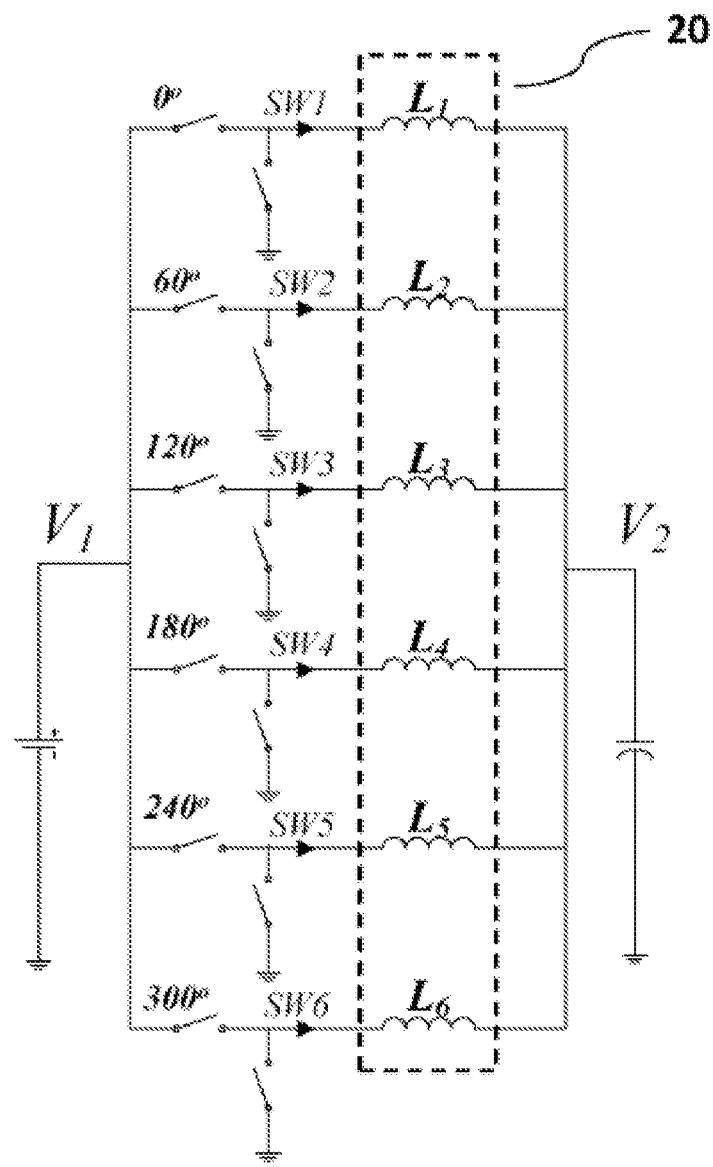
Figure 3:
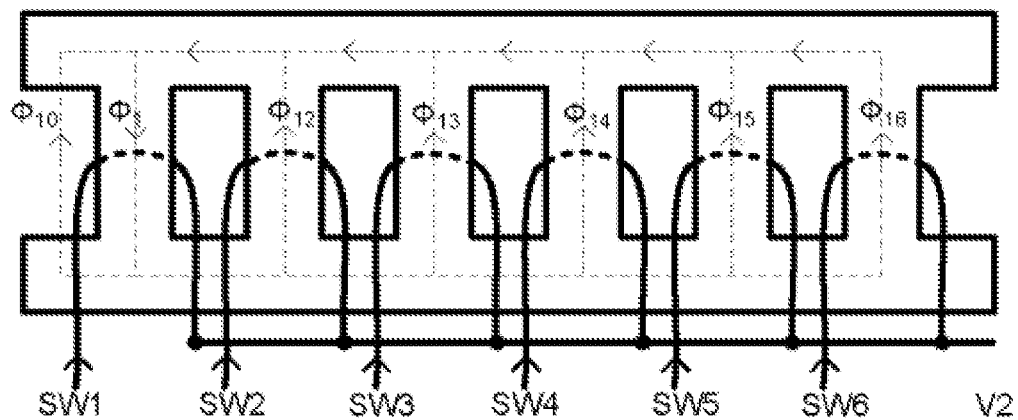
FIG. 3 schematically shows a typical structure of inverse-coupling inductors.

FIG. 1 schematically shows a schematic diagram of a multiphase parallel-connected DC-DC converter in which discrete inductors are applied. FIG. 2 schematically shows a schematic diagram of a multiphase parallel-connected DC-DC converter having inverse-coupling inductors. FIG. 3 schematically shows a typical structure of inverse-coupling inductors. Referring to FIG. 1 to FIG. 3, it is a common practice in the field of power converter to increase the power capacity of a system by paralleling a plurality of sub-converters. This type of converter is generally referred to as a multiphase parallel-connected converter. In the following, a six-phase converter is taken as an example to illustrate a typical multiphase converter. As shown in FIG. 1, the converter converts the input voltage V1 to the output voltage V2 to power the load. Each phase includes a corresponding switch unit and a discrete inductor. The inductor of each phase includes two terminals, one terminal of which is connected to the switch unit and the other terminal of which is connected to the ends of the inductors of other phases as a common output terminal of the entire power converter. In order to achieve a lower output ripple, different phases will operate in an interleaving manner, which is commonly referred to as interleaving parallel connection, as shown in the figure. Conversion efficiency is a very important performance index of the power converter. In order to realize high conversion efficiency, a larger inductance is usually adopted to reduce the AC ripple. In addition, in order to improve the conversion efficiency under light load, the converter usually works in a "phase shedding" mode. For example, when a heavy load is switched to a light load, the controller will gradually reduce the number of the sub-converters until a single sub-converter is operating, thereby reducing the loss and improving efficiency. Dynamic performance is another important performance index of this type of converter. As to the requirements to dynamic, the smaller the inductance of each phase has, the better the dynamic performance is. Therefore, the requirements to the inductance for the dynamic index and the efficiency index are inconsistent.

The use of inverse-coupling inductors in multiphase parallel-connected converters is another widely used technique. Compared with the discrete inductor schemes, the inverse-coupling inductor scheme can better solve the contradiction between the dynamic and the ripple while achieving smaller dynamic inductance and larger steady-state inductance. A six-phase converter is taken as an example to illustrate the structure and principle of the solution. As shown in FIG. 2, the illustrated solution differs from the discrete inductor solution shown in FIG. 1 in that the six-phase converter uses a six-phase coupled inductor unit 20, in which the inductors L1, L2, L3, L4, L5, L6 are inverse-coupled to each other. FIG. 3 shows a basic structure of the six-phase coupled inductor unit comprising two common covers and six magnetic columns connecting the two common covers. The inductor windings of each phase are respectively arranged on corresponding magnetic columns. The dashed line in FIG. 3 shows the distribution of magnetic flux generated by the winding of the first phase when it is energized, wherein $\Phi 1$ is the total flux, $\Phi 10$ is the leakage flux of the winding of the first phase, Φ12, Φ13, Φ14, Φ15, Φ16 are the mutual fluxes coupled to the windings of other phases generated by the winding of the first phase respectively. It can be seen that in this structure, the magnetic flux generated by the winding of the first phase will be coupled to the windings of other phases. Similarly, the same condition may apply to the windings of other phases. Therefore, in the coupled inductor unit 20, any two phases are mutually coupled. When the coupled inductor unit 20 is in a phase shedding process and is in a light load mode, for example in the structure shown in FIG. 2, assuming that the sixth phase is shed as the load becomes lighter, the original mutual flux Φ16 would turn to be the leakage flux of the sub-inductor of the first phase. Therefore, phase shedding will lead to increased leakage inductance, which will result in two problems: first, the saturation current of the inductor decreases; and second, the equivalent dynamic inductance of the inductor will increase and the dynamic performance will decline.

Figure 4:
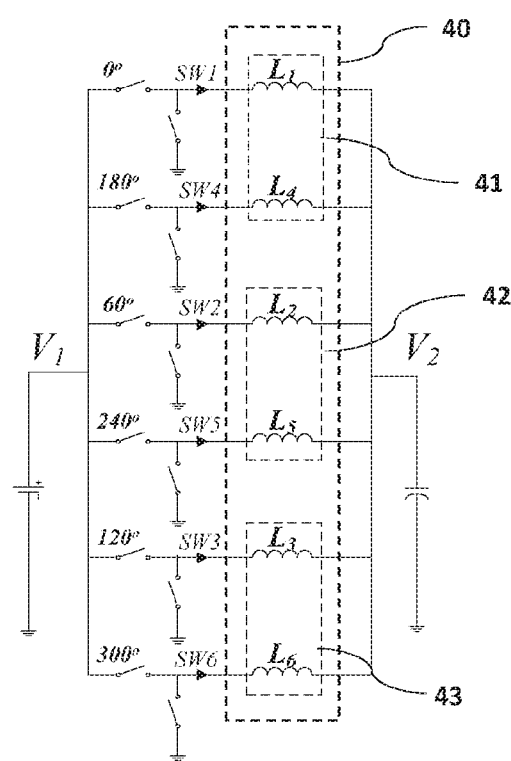
FIG. 4 schematically shows a multiphase parallel-connected DC-DC converter with an integrated inductor unit according to an embodiment of the present disclosure.

Aspects of the present disclosure will be described in more detail below with reference to specific examples of the disclosure. FIG. 4 schematically shows a multiphase parallel-connected DC-DC converter having a partially inverse-coupled inductor according to an embodiment of the present disclosure. Referring to FIG. 4, it shows a six-phase power converter (e.g., a six-phase Buck converter) that includes an integrated inductor unit 40. The windings can be realized by a single strand wire or multiple strands wire, or by a flat wire or a metal sheet, etc., and the disclosure is not limited thereto. For example, the winding may be formed by bending a flat wire or a metal sheet into a U-shape. The U-shaped winding is inserted into a magnetic core structure having a specific shape (e.g., a rectangular shape, a ladder-like shape, an EE shape, etc.). One end of each winding is respectively connected to terminal SW (e.g., SW1, SW2, SW3, SW4, SW5, SW6) of each phase switch unit, and the other end of each winding is connected together to form an output terminal V2 of the entire converter. The reference direction of the inductor current is defined from terminal SW to terminal V2, as shown in the figure by the arrow. The actual direction of the output DC current can be the same as the reference direction, i.e., the current is positive. However, the present disclosure is not limited to this, and the actual direction of output DC current may also be different from the reference direction, i.e., the current is negative.

In the converter of FIG. 4, the integrated inductor unit 40 includes three inductor subunits 41, 42 and 43. The inductors in the same inductor subunit are inverse-coupled with each other, and the inductors in different inductor subunits are not coupled with each other. That is, the two inductors L1 and L4 in the inductor subunit 41 are inverse-coupled to each other, the two inductors L2 and L5 in the inductor subunit 42 are inverse-coupled with each other, and the two inductors L3 and L6 in the inductor subunit 43 are inverse-coupled with each other. However, the inductor subunits 41, 42, 43 are not coupled to each other. A coupling coefficient between the inductor subunits is less than a coupling coefficient between the inductors in the same inductor subunit. For example, the inductors of the same inductor subunit are inverse-coupled to each other and are not coupled to the inductors of the other inductor subunits.

In the inverse-couple of the inductors, the DC flux generated by different inductors would cancel each other (e.g., partially cancel). For the inductors which are not coupled, little or no flux produced by one inductor passes through another inductor. In order to reduce the output ripple, the multiphase parallel-connected power converter usually operates in an interleaving mode. A preferred phase arranging method is as follows. In a converter, integrated inductor unit includes M inductor subunits each of which has i coupled inductors. In this embodiment, it is clear that M=3 and i=2. The working phases of the inductors in the same inductor subunit are different from each other by about 360°/i, and the M×i inductors of the whole M inductor subunits are different from each other by about 360°/(M×i). In this embodiment, i=2 and M=3, so the phase difference in the same inductor subunit is about 360°/i=180 degrees and the phase difference in different inductor subunits is about 360°/(M×i)=60 degrees. For example, phases of L1 and L4 in the inductor subunit 41 are respectively 0 degrees and 180 degrees, with 180 degrees different from each other. The phases of L2 and L5 in the inductor subunit 42 are 60 degrees and 240 degrees respectively, with 180 degrees different from each other. The phases of L3 and L6 in the unit 43 are respectively 120 degrees and 300 degrees, with 180 degrees different from each other. The inductors of the inductor subunits 41, 42 and 43 are about 60 degrees different from each other.

Figure 5A:
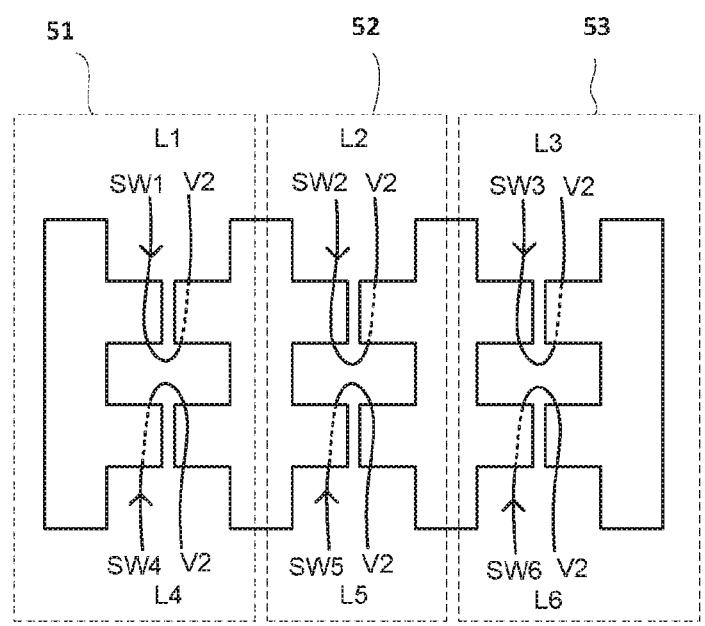
FIG. 5a is a structural example of an integrated inductor unit according to an embodiment of the present disclosure.
Figure 5B:
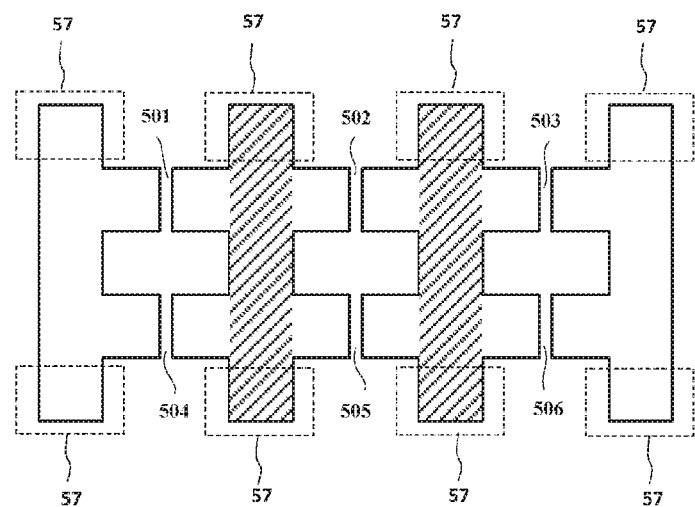
Figure 5C:
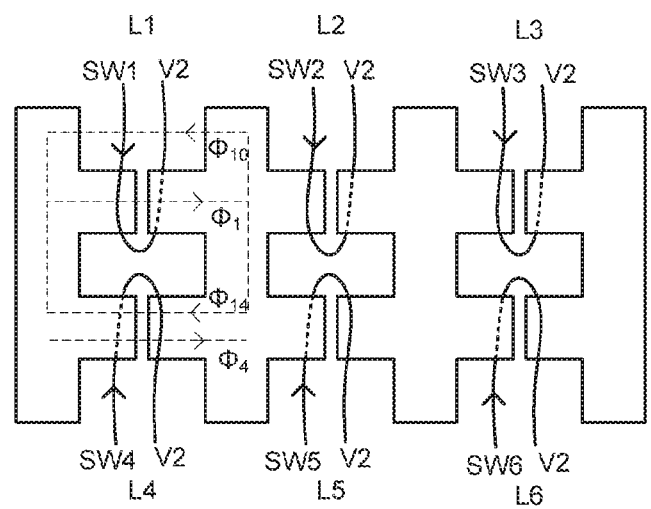

FIG. 5a schematically shows a structural example of an integrated inductor unit according to an embodiment of the present disclosure; FIG. 5b schematically shows the structure of the core of the integrated inductor unit shown in FIG. 5a; and FIG. 5c schematically shows the magnetic flux distribution of the integrated inductor unit shown in FIG. 5a. Referring to FIG. 5a to FIG. 5c, a multiphase parallel-connected DC-to-DC converter according to an embodiment of the present disclosure will be described in detail.

FIG. 5a shows an exemplary structure of an integrated inductor unit 40 in the converter shown in FIG. 4. The integrated inductor unit includes a core and windings. The core may be made of high permeability material such as ferrite, amorphous and silicon steel piece, with a high relative permeability greater than 50, but the disclosure is not limited to this. Referring to FIG. 5a and FIG. 5b, the integrated inductor unit may be divided into a plurality of inductor subunits 51, 52 and 53. In the present embodiment, the number of inductor subunits M=3, and each of the inductor subunits may include a part of the core having a "rectangular" like shape with a hollow. On the four corner of the magnetic core with the "rectangular" like shape, there may be provided with some protrusions 57 to increase the leakage inductance within the inductor subunit. For example, such a protrusion 57 is schematically shown in FIG. 5b. However, the present disclosure is not limited thereto. In other embodiments, other numbers of subunits may be included. Each inductor subunit may include a plurality of inductors. In the present embodiment, each inductor subunit includes equal numbers of inductors, i.e., i inductors, which equals to two (i=2). For example, the inductor subunit 51 includes two mutually coupled inductors L1 and L4, the inductor subunit 52 includes two mutually coupled inductors L2 and L5, and the inductor subunit 53 includes two mutually coupled inductors L3 and L6. However, the present disclosure is not limited thereto. In other embodiments, each of the inductor subunits may include other numbers of the inductors, and the number of the inductors included in each inductor subunit may not be equal. The magnetic core of each inductor subunit shares the common portion (i.e., common magnetic column) of the magnetic core with the adjacent inductor subunit, as shown by the shaded portion in FIG. 5b. The portion of the magnetic core of the inductor subunit that is not shared with the adjacent inductor subunit is shown by the blank part in FIG. 5b. The columns which the windings are wound on respectively may be refer to as first magnetic columns, for example, the upper and lower columns. The non-common portion may be provided with air gaps, for example, on the first magnetic columns respectively, to achieve a certain inductance and to avoid saturation. The common magnetic column has no air gap. As shown in FIG. 5b, 501, 502, 503, 504, 505 and 506 are air gaps of the inductors L1, L2, L3, L4. L5 and L6. The winding of each inductor is wound around the non-common portion of the magnetic core. Further, in order to reduce the stray flux generated by the air gap, the winding may be disposed on the magnetic column where the air gap is located to cover the air gap, but the disclosure is not limited thereto. The common portion of the magnetic core does not include any air gap and are for the flux decoupling. For details, please refer to FIG. 5c. FIG. 5c exemplarily shows the magnetic flux distribution of the inductor subunit 51 when current flows through the coil of the inductor subunit 51. Φ1 is the total magnetic flux generated by the current in the inductor L1 and comprises two parts, wherein Φ10 is the leakage magnetic flux of the inductor L1, Φ14 is the mutual flux coupled to the inductor L4 which is generated by the current in the inductor L1. Φ4 is the total flux generated by the current in the inductor L4. Since there is no air gap in the common magnetic column between the inductor subunit 51 and the inductor subunit 52 and the magnetic resistance thereof is small, and the air gaps 502 and 505 are provided in the non-common portion of the inductor subunit 52 and the magnetic resistance thereof is large, the flux generated by the current in the inductor L1 is only coupled to the inductor L4 which is in the same inductor subunit and not coupled to the inductors (L2, L5, L3 and L6) which are in other inductor subunits 52 and 53. In practical applications, there may be some degree of weak coupling between the units due to the leakage flux, but the object of the present disclosure can basically be achieved as long as the coupling coefficient between the units is less than 0.2. In this case, subunits can be considered uncoupled. According to connection relationship between the inductor winding and the switch unit, the inductors in the same inductor subunit are inverse-coupled with each other, that is, the magnetic fluxes caused by the direct current in different inductors of the same inductor subunit at least partially cancel each other. If the mutual flux Φ14 generated by the inductor L1 and the magnetic flux Φ4 generated by the inductor L4 are opposite to each other, the magnetic fluxes cancel each other to achieve inverse-coupling.

More specifically, as shown in FIG. 5C, when the switch unit SW1 operates, the current flows in the direction of the arrow in the coil of the inductor L1, thereby generating the flux Φ1, Φ10, Φ14 in the direction as indicated by the arrow shown in the magnetic core. In addition, when the switch unit SW4 operates, accordingly, the current flows in the direction as indicated by the arrow shown in the coil of the inductor L4 to generate the magnetic flux Φ4 (leakage flux Φ40, mutual flux Φ41 are not shown) in the direction as indicated by the arrow in the magnetic core. As can be seen in FIG. 5c, the mutual flux Φ14 generated by the inductor L1 is opposite to the magnetic flux Φ4 generated by the inductor L4, so that the inductor L and the inductor L4 are inverse-coupled.

In order to achieve better conversion efficiency of the converter under different loads, the converter according to the embodiment of the present disclosure adopts the working mode of "subunit shedding", because the inductor subunits are not coupled to each other. Depending on the output power of the converter, all the switches in the switch units which are coupled to the y×i inductors of the y inductor subunits are controlled to be turned off, so that the y inductor subunits are out of operation, wherein y is a natural number, 0<y<M, and the phase difference of the remaining inductors is controlled to be 360°/[(M−y)×i]. In this way, y×i inductors of the y inductor subunits are shed at one time, rather than only a single phase is shed.

With reference to the embodiment of FIG. 4, for example, in the case of heavy load, the output power is large and all three inductor subunits 41, 42 and 43 of the integrated inductor unit 40 are put into operation, so the number of the inductor subunits M=3 and the number of inductors in each inductor subunits i=2, the phase difference between the windings is about 360°/(M×i), and the phase difference within the same unit is about 360°/i. When the load becomes lighter, all the inductors in one of the inductor subunits may be completely moved out of operation, that is, y=1, for example, the inductor subunit 43. At this time, all the switch units coupled to the inductor subunit 43 do not perform the switching operation. The phase difference of the remaining inductor windings is adjusted to be 360°/[(M−1)×i], with the phase difference within the remaining inductor subunits constant, i.e., still 360°/i. When the load is further reduced, the output power of the inverter is reduced, and a further inductor subunit 42 can also be out of operation, that is, y=2. The phase difference of the remaining inductor windings is adjusted to be 360°/[(M−2)×i], with the phase difference within the remaining inductor subunits constant, i.e., still 360°/i. Further, when y=M−1, only the last inductor subunit is still in operation. According to the different output powers of the converter, if it is needed to cut off more inductors when only the last inductor subunit is still in operation, the number s out of i inductors in the last inductor subunit can be further cut off. The switch units coupled to the s inductors of the remaining one inductor subunit are controlled to be turned off, wherein s is a natural number, 0<s<i and the phase difference of the remaining i−s inductors is controlled to be 360°/(i−s). For example, when only one inductor subunit 41 is still in operation, if the output power of the converter is further reduced, the switch unit coupled to the inductor L4 is controlled to be turned off, and the operation of the inductor L4 is terminated. Thus, only the inductor L1 is still in operation. However, the present disclosure is not limited thereto. For example, a plurality of inductor subunits may be shed simultaneously, and it is not necessary to adopt a specific sequence for the shedding.

The inductors of the same inductor subunit are inverse-coupled to each other. Compared with the uncoupled or the positive coupled scheme, the inverse-coupling solution can achieve lower ripple current and lower dynamic inductance. At the same time, since the direct current fluxes are at least partially cancelled with each other, the saturation characteristics of the inductors will be significantly increased. The control mode of the controller can be changed from the traditional "phase shedding" mode to the "subunit shedding" mode in order to achieve the best efficiency throughout the entire load range when the load changes. The "subunit shedding" mode is a new way to accomplish the phase shedding. For example, from heavy load to light load, the controller will shed each of the inductor subunits one by one to enhance the light load efficiency of the entire converter. However, since the inductor subunits are not coupled to each other, shedding the corresponding inductor subunit will not affect the saturation characteristics and the dynamic performance. The magnetic column between the inductor subunits is shared by the two adjacent inductor subunits and thus has a smaller core volume compared with the discrete inductors, which can increase the power density of the entire converter.

Hereinafter, various aspects of the embodiments of the present disclosure will be further described with reference to other embodiments of the disclosure.

Figure 6A:
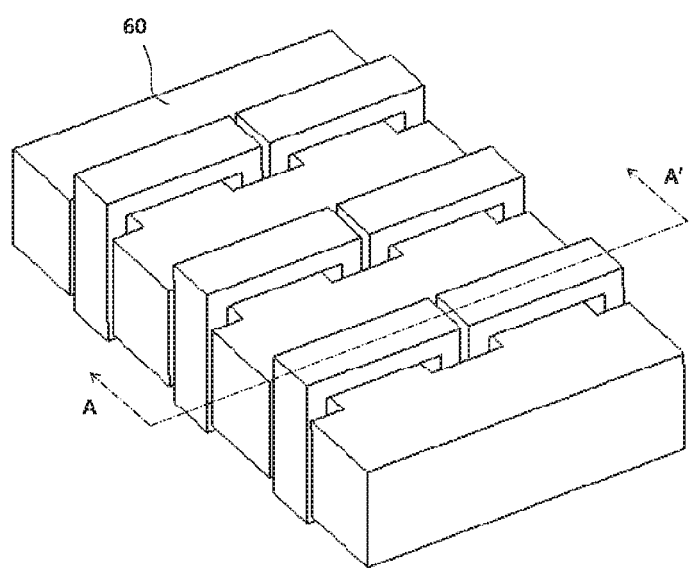
FIG. 6a schematically shows an example of another structure of an integrated inductor unit according to an embodiment of the present disclosure.
Figure 6B:
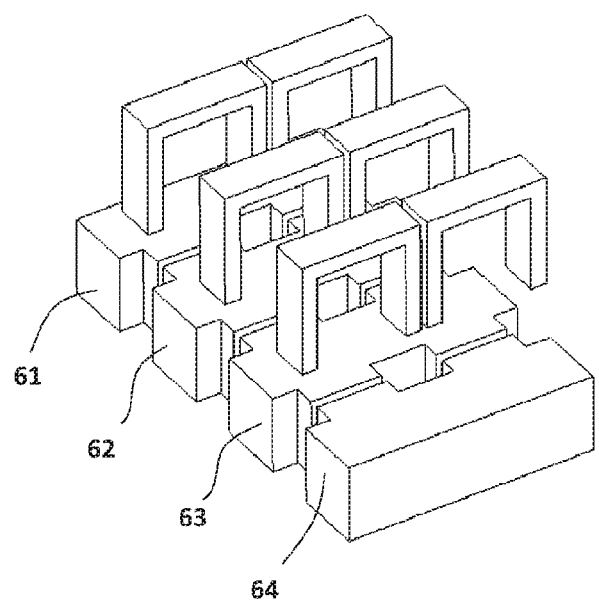
Figure 6C:
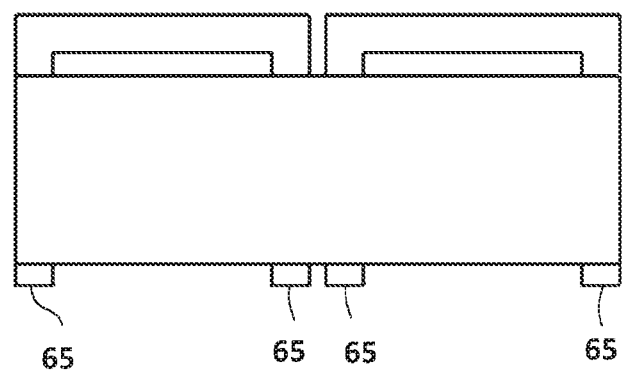

FIG. 6a schematically shows another structure of an integrated inductor unit according to an embodiment of the disclosure; FIG. 6b schematically shows a exploded view of the integrated inductor unit shown in FIG. 6a; FIG. 6c schematically shows a side view of the integrated inductor unit shown in FIG. 6a; and FIG. 6d schematically shows a cross-sectional view of the integrated inductor unit taken along the line AA' in FIG. 6a.

Figure 6D:
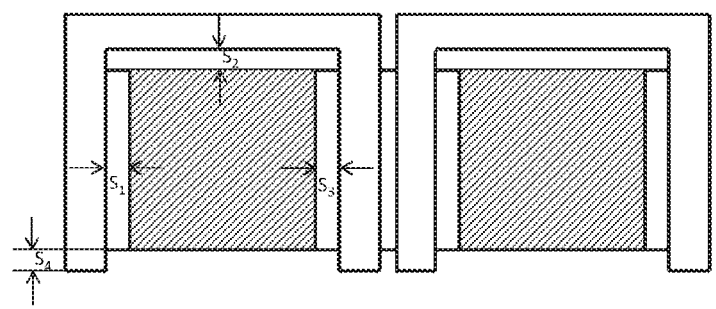

FIGS. 6a to 6d show another exemplary structure of the integrated inductor unit 40 in the converter shown in FIG. 4. The present embodiment is similar to the embodiment shown in FIG. 5a to FIG. 5c, and their difference mainly lies in the wire type of the adopted winding and the form of the lead of the inductor. According to this embodiment, the winding may be formed by bending a flat wire or metal sheet into a U-shape. The windings may surround the air gap (e.g., covering the air gap), thereby reducing the fringing flux around the air gap. In addition, in order to avoid the eddy-current loss generated in the winding caused by the fringing flux around the air gap, the winding may be separated from the magnetic column by a certain distance rather than abut against it. For example, as shown in FIG. 6d, the winding is separated from the magnetic core by a distance S1, S2 and S3. The two terminal surfaces of each U-shaped winding, shown as 65 in FIG. 6c, can be directly connected to the printed circuit board (PCB) as the pads of the inductor without further being bent. This is advantageous in that the eddy current loss on the inductor winding caused by the air gap fringing flux can be further reduced. Additionally, the winding extends out of the bottom of the magnetic core by a certain distance S4 so that the air gap of the magnetic core could be separated from the PCB after the inductor is installed on the PCB, so as to reduce the eddy current loss on the PCB. However, the present disclosure is not limited thereto. The two terminal surface of U-shaped winding may be on the same plane.

Figure 7A:
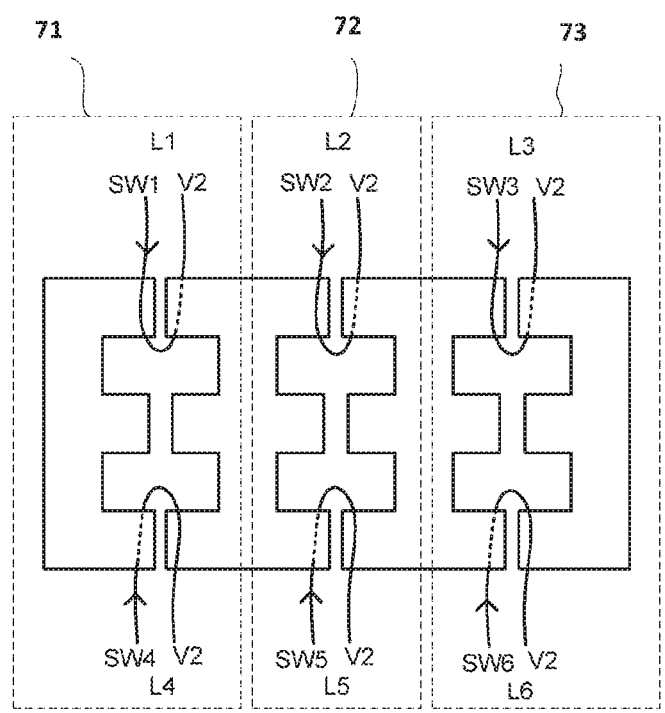
FIG. 7a schematically shows an example of another structure of the integrated inductor unit according to an embodiment of the present disclosure.
Figure 7B:
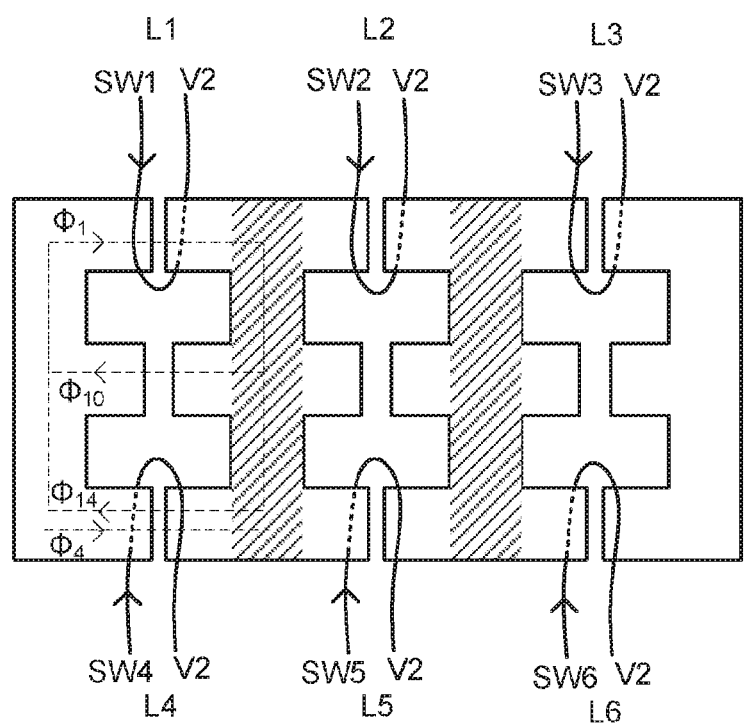

FIG. 7a schematically shows an example of another structure of an integrated inductor unit according to an embodiment of the present disclosure; and FIG. 7b schematically shows the magnetic flux distribution of the integrated inductor unit shown in FIG. 7a.

FIGS. 7a and 7b illustrate another exemplary structure of the integrated inductor unit 40 in the converter shown in FIG. 4. Referring to FIG. 7a, the multiphase integrated inductor unit includes three inductor subunits 71, 72 and 73, and each of the inductor subunits includes two inductors. The main difference from the embodiment shown in FIG. 5 lies in that each of the inductor subunits has an EE type magnetic core. The whole magnetic core of the integrated inductor unit includes three EE type magnetic core of the three inductor subunits. The common portion (i.e., common magnetic column) of the magnetic core shared by the adjacent inductor subunits is shown by the shaded part in FIG. 7b. The common portion is shared by two adjacent EE type magnetic core. The common portion has no air gap, and thus the different inductor subunits are not coupled to each other. The inductors within the inductor subunits are coupled to each other. The columns of the non-common portion which the windings are wound on respectively may be refer to as first magnetic columns, for example, the upper and lower columns. The column of the non-common portion which the windings are not wound on may be refer to as second magnetic columns, for example, the center column. The first and second magnetic columns have air gaps and are coupled to the common magnetic column. The flux distribution of inductors L1 and L4 is shown in FIG. 7b when current flows through inductors L1 and L4. The mutual flux Φ14, which is generated by the inductor L1 and coupled to L4, is opposite to the magnetic flux Φ4 generated by the inductor L4, and the fluxes Φ14 and Φ4 cancel each other at least partially to achieve inverse-coupling. The leakage flux Φ10, which is generated by the inductor L1 and not coupled to the inductor L4, is distributed in the center column of the EE-type magnetic core unit. For example, in the present embodiment, three air gaps are respectively disposed on two side columns and one center column of the EE-type magnetic core, and the windings of each of three inductor subunits are respectively wound around the two side columns. Compared with the previous embodiment, the main advantage of this embodiment is that a larger leakage inductance can be achieved and the leakage inductance can be conveniently adjusted. For example, the leakage inductance can be adjusted by adjusting the air gap on the center column of the EE-type magnetic core.

Figure 8A:
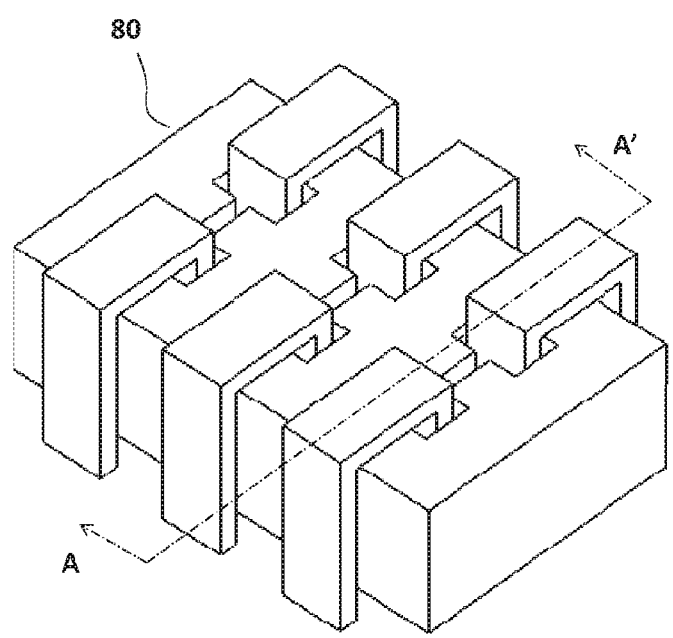
FIG. 8a schematically shows an example of another structure of an integrated inductor unit according to an embodiment of the present disclosure.
Figure 8B:
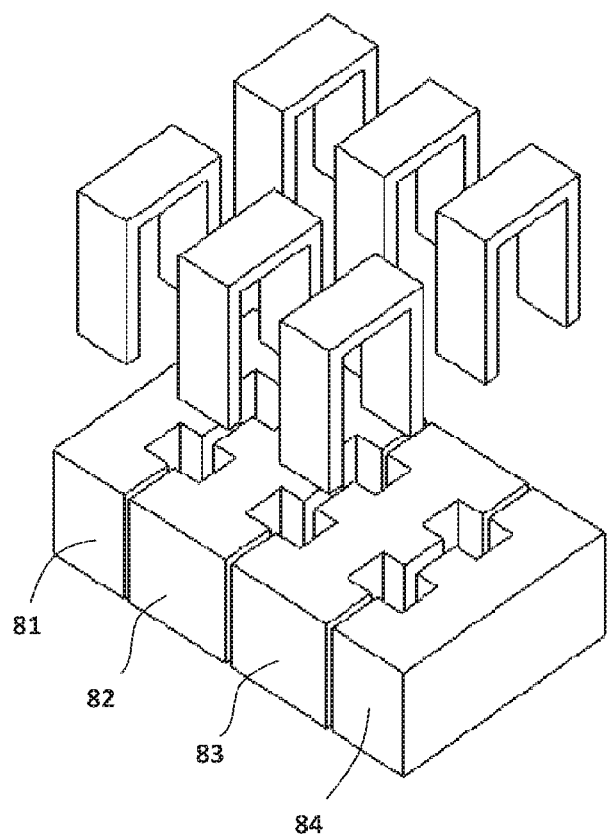
Figure 8C:
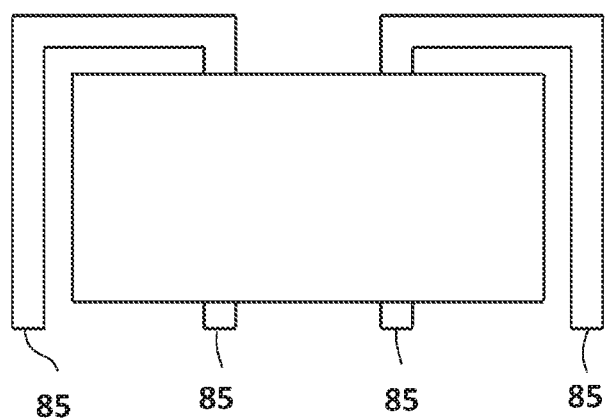

FIG. 8a schematically shows another structure of an integrated inductor unit according to an embodiment of the present disclosure; FIG. 8b schematically shows a structural exploded view of the integrated inductor unit shown in FIG. 8a; FIG. 8c schematically shows a side view of the integrated inductor unit shown in FIG. 8a; and FIG. 8d schematically shows a cross-sectional view of the integrated inductor unit taken along the line AA in FIG. 8a.

Figure 8D:
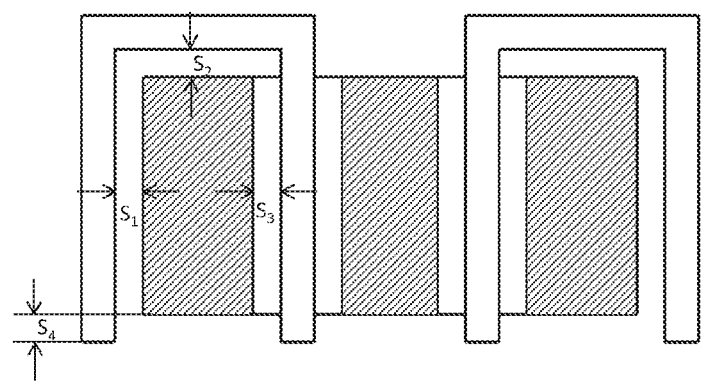

FIG. 8a to 8d show another exemplary structure of the integrated inductor unit 40 in the converter shown in FIG. 4. This embodiment is similar to the embodiment shown in FIG. 7a to FIG. 7b, and the difference therebetween mainly lies in the wire type of the adopted winding and the form of the lead of the inductor. According to this embodiment, the winding may be formed by bending a flat wire or metal sheet into U-shape. The windings may surround the air gap (e.g., covering the air gap), thereby reducing the fringing flux around the air gap. In addition, in order to avoid the eddy-current loss generated in the winding caused by the fringing flux around the air gap, the winding may be separated from the magnetic column by a certain distance rather than abut against it. For example, as shown in FIG. 8d, the winding is separated from the magnetic core by a certain distance S1, S2 and S3. The two terminal surfaces of each U-shaped winding, shown by 85 in FIG. 8c, can be directly connected to the printed circuit board (PCB) as the pads of the inductor without further being bent. This is advantageous in that the eddy current loss on the inductor winding caused by the air gap fringing flux can be further reduced. Additionally, the winding extends out of the bottom of the magnetic core by a certain distance S4 so that the air gap of the magnetic core could be separated from the PCB after the inductor is installed on the PCB, so as to reduce the eddy current loss on the PCB.

Figure 9A:
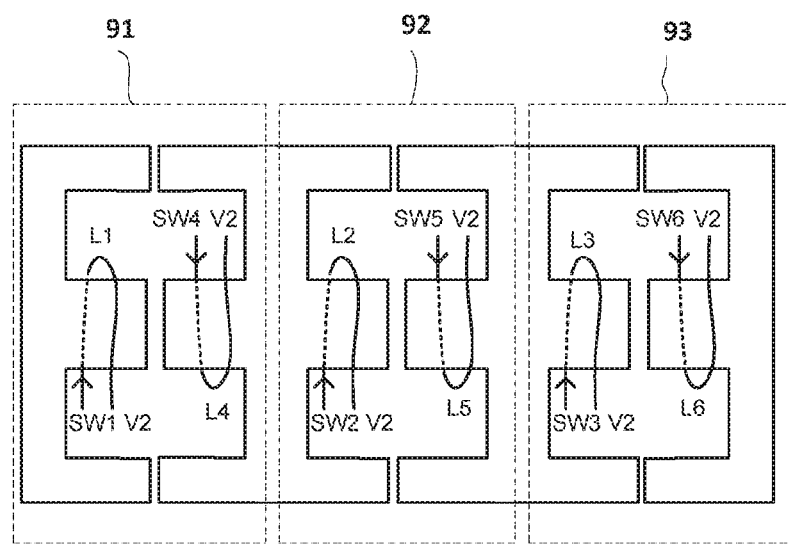
FIG. 9a schematically shows an example of another structure of an integrated inductor unit according to an embodiment of the present disclosure.
Figure 9B:
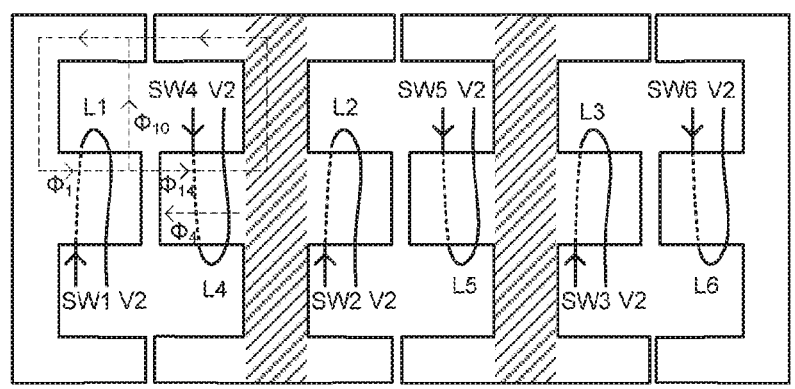

FIG. 9a schematically shows an example of another structure of an integrated inductor unit according to an embodiment of the disclosure; and FIG. 9b schematically shows the magnetic flux distribution of the integrated inductor unit shown in FIG. 9a.

FIGS. 9a and 9b show another exemplary structure of the integrated inductor unit 40 in the converter shown in FIG. 4. Referring to FIG. 9a, the integrated inductor unit of the present embodiment includes three inductor subunits 91, 92 and 93, each of which has an EE type magnetic core. The whole magnetic core of the integrated inductor unit includes three EE type magnetic core of the three inductor subunits. Each inductor subunit includes two inductors. The common portion is shared by two adjacent EE type magnetic core. The adjacent inductor subunits share the common portion (i.e., common magnetic column) of the magnetic core, as shown in the shaded part in FIG. 9b, and the common portion has no air gap, so different inductor subunits are not coupled to each other. The inductors within the inductor subunit are coupled to each other. The column of the non-common portion which the windings are wound on together may be refer to as third magnetic columns, for example, the center column which two windings are wound on. FIG. 9b shows the magnetic flux distribution of the inductors L1 and L4 when the current flows through the inductors L1 and L4. The flux, which is generated by the inductors L1 and coupled to L4, is opposed to the flux Φ4 generated by the inductors L4. The fluxes Φ14 and Φ4 at least partially cancel each other to achieve inverse-coupling. The air gap is disposed at a non-common portion of the magnetic core, for example a center column or side columns of the EE type magnetic core unit, or air gaps are provided in both a center column or side columns. The main difference between this embodiment and the embodiment shown in FIG. 7a to FIG. 7b lies in that both the windings in this embodiment are wound on the center column of the EE-type magnetic core, and thus the coupling is relatively strong. The leakage flux Φ10 is shown in FIG. 9b. The common portion in many embodiment is actually a magnetic column, so the common portion of the magnetic core may also be named as common magnetic column. The common portion of the magnetic core (i.e., common magnetic column, which is shaded with slashes in FIG. 9b) is perpendicularly coupled to the magnetic column with the winding wound on, as shown in FIG. 9b.

Figure 10A:
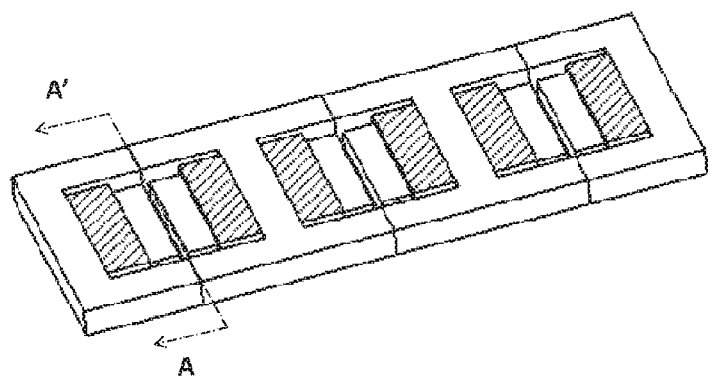
FIG. 10a schematically shows an example of another structure of an integrated inductor unit according to an embodiment of the present disclosure.
Figure 10B:
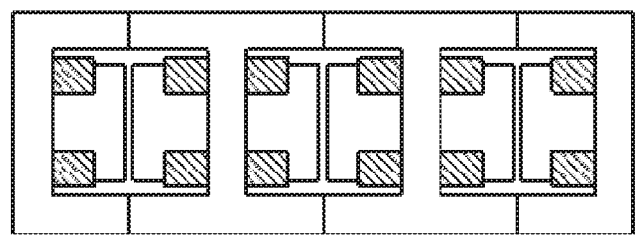
Figure 10C:
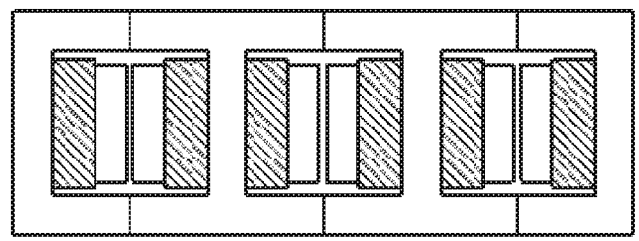
Figure 10D:
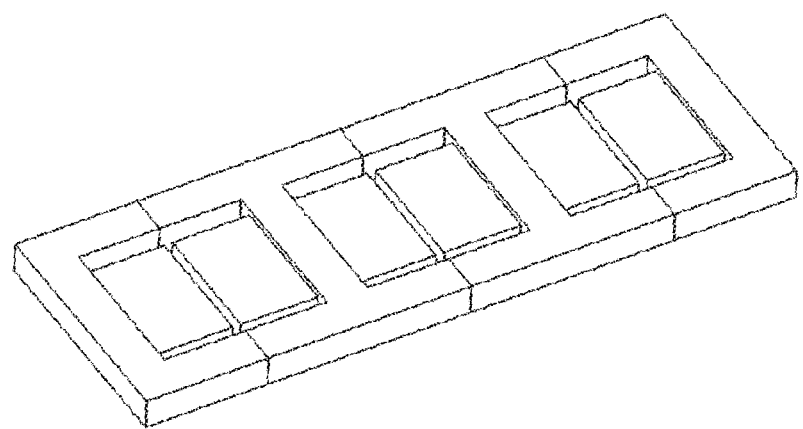

FIG. 10a schematically shows another structure of an integrated inductor unit according to an embodiment of the disclosure; FIG. 10b shows schematically a bottom view of the electrically integrated inductor unit shown in FIG. 10a; FIG. 10c schematically shows a top view of the integrated inductor unit of FIG. 10a; FIG. 10d schematically shows the structure of the core of the integrated inductor unit of FIG. 10a; and FIG. 10e schematically shows a cross sectional view of the integrated inductor unit along the line A-A' in FIG. 10a.

Figure 10E:
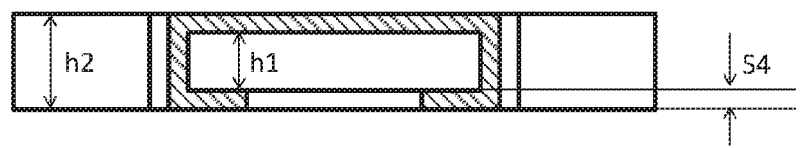

FIG. 10a to FIG. 10e show another exemplary structure of the integrated inductor unit 40 in the converter shown in FIG. 4. This embodiment is a preferred embodiment of the embodiment shown in FIGS. 9a to 9b in the situation where the height is required to be restricted. The winding in this embodiment can be made by bending a flat wire or a metal sheet. One of the advantages is that the terminals of the winding can be used as the pads of inductor after being bent, but the disclosure is not limited thereto. The whole magnetic core includes three EE type magnetic core unit connected in a line. The height h1 of the center column in the EE type magnetic core unit is smaller than the height h2 of the side column and the cover. The air gap is arranged in the middle of the center column of the EE type magnetic core unit. The winding is provided at both ends of the center column and away from the air gap. Since the winding does not directly cover the air gap and the windings can be in direct contact with the center column, this embodiment can achieve a very low overall height. In this embodiment, since the winding is wound around the center column, this solution can have smaller leakage flux. Further, in order to reduce the losses introduced by the air gap fringing flux to the PCB on which the inductor is mounted, the lower plane of the center column is separated from the lower plane of the integrated inductor unit by a certain distance S4, as shown in FIG. 10e.

Figure 11A:
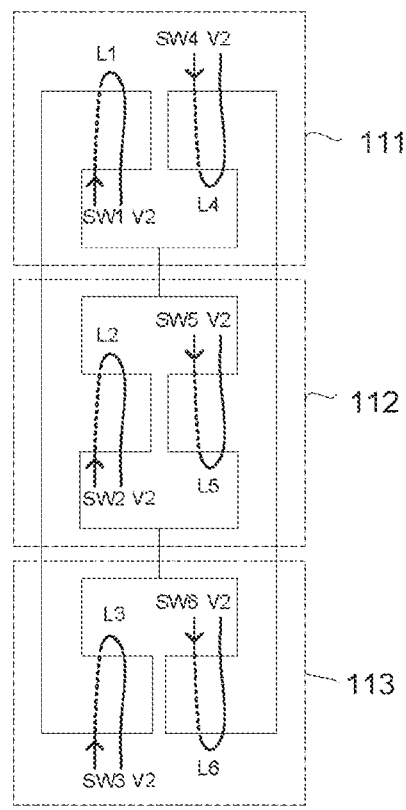
FIG. 11a schematically shows another configuration example of an integrated inductor unit according to an embodiment of the present disclosure.
Figure 11B:
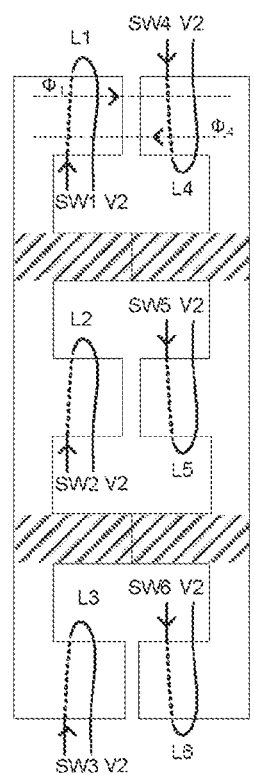

FIG. 11a schematically shows another structural example of an integrated inductor unit according to an embodiment of the present disclosure; and FIG. 11b schematically shows the magnetic flux distribution of the integrated inductor unit shown in FIG. 11a.

Figure 12:
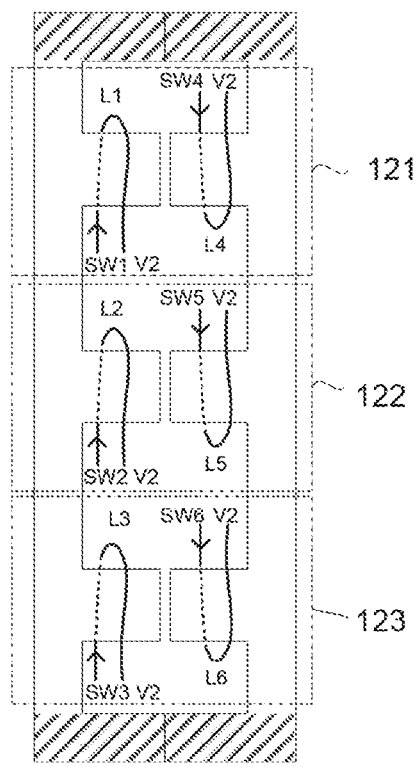
FIG. 12 schematically shows an example of another structure of an integrated inductor unit according to an embodiment of the present disclosure.

FIGS. 11a and 11b show another exemplary structure of the integrated inductor unit 40 in the converter shown in FIG. 4. Referring to FIG. 11a, the integrated inductor unit includes three inductor subunits 111, 112, and 113 connected in a line. The inductor subunits 111 and 113 have magnetic core units with a rectangular-like shape. The inductor subunit 112 has an EE type magnetic core unit. Adjacent core units share a common portion of the magnetic core, as shown by shaded parts in FIG. 11b. The common portion (i.e., common magnetic column) of the magnetic core does not include an air gap, so that different inductor subunits are decoupled from each other. The column of the non-common portion which the windings are wound on together may be refer to as third magnetic columns, for example, the center column which two windings are wound on. According to this embodiment, since the common magnetic columns could realize the decoupling of the magnetic flux of respective inductor subunit, the common portions of the magnetic core in this embodiment are also referred to as decoupling magnetic columns. However, the invention is not limited herein, the decoupling magnetic columns may also be non-common portions, so the decoupling magnetic columns may be common magnetic columns (shaded with slashes) as show in FIG. 5b,7b,9b,11b or non-common magnetic columns as shown in FIG. 12, 13. When the integrated inductor unit 40 according to the present embodiment is used in a multiphase converter, the inductors in the same inductor subunit are inverse-coupled to each other. That is, the direct current flux generated by the two windings in the same inductor subunit at least partially cancel each other. According to the present embodiment, the air gap is disposed at the non-common portion of the magnetic core, and the winding is wound around the magnetic column where the air gap is located. The decoupling magnetic column and the column with the winding wound around are arranged parallel to each other and are arranged alternately.

FIG. 12 schematically shows another structure of an integrated inductor unit according to an embodiment of the present disclosure. As shown in FIG. 12, the integrated inductor unit includes three inductor subunits 121, 122, and 123, and each inductor subunit includes two inductors. Each of the inductor subunits includes a magnetic column and two windings. The magnetic column has an air gap, and the two windings are respectively wound around the magnetic column to form the 2 inductors in the inductor subunit. In addition, the integrated inductor unit further includes a decoupling magnetic column (shown with shaded slashes), and the decoupling magnetic column has no air gap and has no winding wound around it. The decoupling magnetic column is arranged in parallel with the magnetic column in the inductor subunit, and the magnetic column in the inductor subunit is coupled with the decoupling magnetic column. The decoupling magnetic column and the column with the winding wound around it are arranged parallel to each other.

Figure 13:
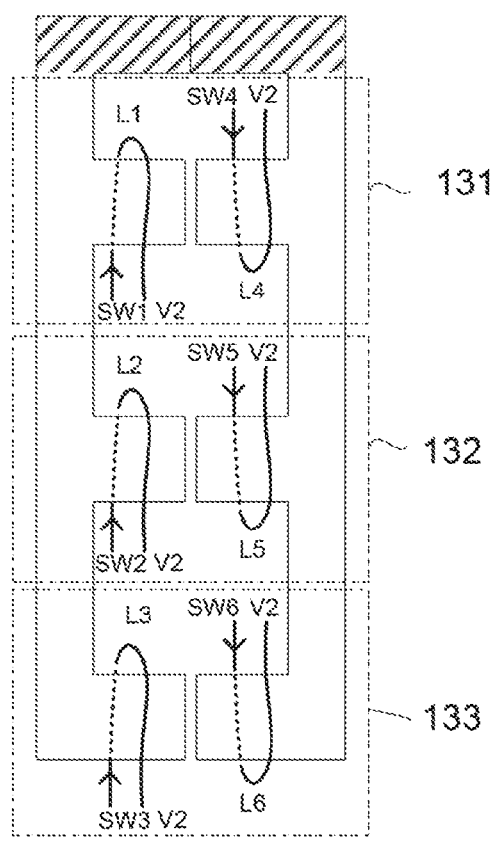
FIG. 13 schematically shows an example of another structure of an integrated inductor unit according to an embodiment of the present disclosure.

FIG. 13 schematically shows another structure of an integrated inductor unit according to an embodiment of the present disclosure. As shown in FIG. 13, the integrated inductor unit includes three inductor subunits 131, 132 and 133, and each inductor subunit includes two inductors. Each of the inductor subunits includes a magnetic column and two windings, wherein the magnetic column has an air gap, and the two windings are respectively wound around the magnetic column to form the 2 inductors in the inductor subunit. In addition, the integrated inductor unit further includes a decoupling magnetic column (shown with shaded slashes), and the decoupling magnetic column has no air gap and has no winding wound around it. The decoupling magnetic column is arranged in parallel with the magnetic column in the inductor subunit, and the magnetic column in the inductor subunit is coupled with the decoupling magnetic column. The embodiment of FIG. 13 is different from the embodiment of FIG. 12 in that the integrated inductor unit of FIG. 13 has only one decoupling magnetic column. The decoupling magnetic column and the magnetic column with the winding wound around are arranged parallel to each other.

The embodiments of FIG. 12 and FIG. 13 illustrate an integrated inductor unit having one or more decoupling magnetic columns. However, it will be understood by those skilled in the art that the present disclosure is not limited thereto, and the integrated inductor unit may have other numbers decoupling magnetic column.

Figure 14:
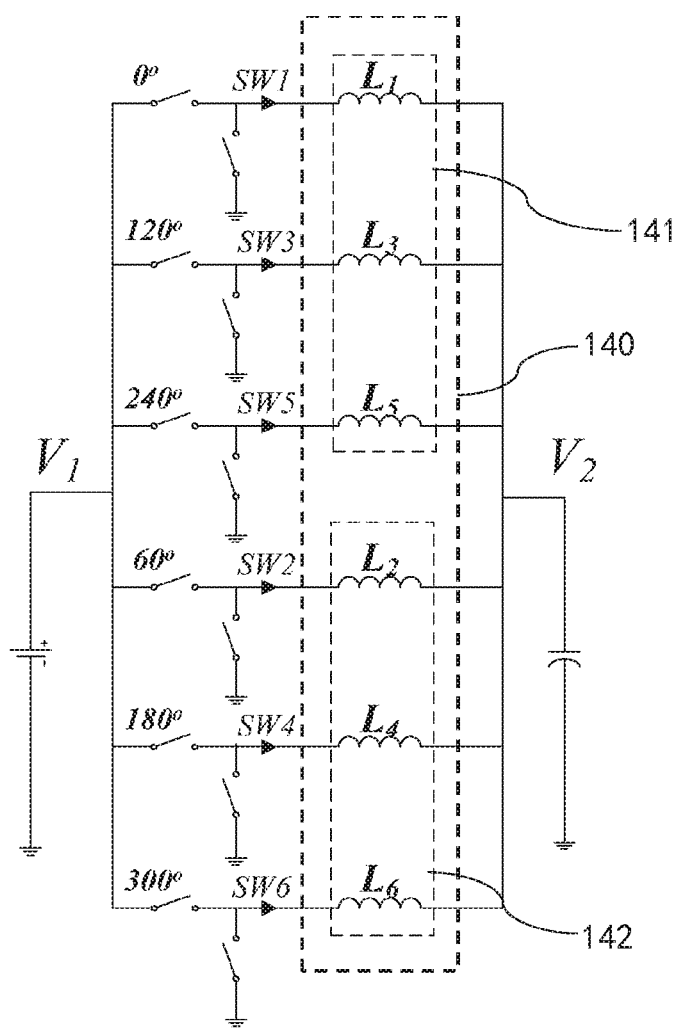
FIG. 14 schematically shows a multiphase parallel-connected DC-DC converter with an integrated inductor unit according to another embodiment of the present disclosure.

FIG. 14 schematically shows a multiphase parallel-connected DC-DC converter to which an integrated inductor unit is applied according to another embodiment of the present disclosure.

FIG. 14 shows a six-phase power converter that includes a six-phase integrated inductor element 140 having six inductor windings. The number of the windings of the integrated inductor unit may be equal to the number of the phases of the multiphase converter. One end of each winding is respectively connected to terminal SW of each corresponding switch unit, and the other end of each winding is connected together to form an output terminal V2 of the entire converter. The reference direction of the inductor current is defined from terminal SW to terminal V2, as shown in the figure by the arrow. The actual direction of the output DC current can be the same as the reference direction. i.e., the current is positive. However, the present disclosure is not limited to this, and the actual direction of output DC current may also be different from the reference direction, i.e., the current is negative.

The multiphase integrated inductor unit 140 includes two inductor subunits 141 and 142. The inductors in the same inductor subunit are inverse-coupled with each other, and the inductors in different inductor subunits are not coupled with each other. That is, the three inductors L1, L3 and L5 included in the inductor subunit 141 are inverse-coupled with each other, the three inductors L2. L4 and L6 included in the inductor subunit 142 are inverse-coupled to each other, but the inductors L, L3 and L5 in the inductor subunit 141 are not coupled with the inductors L2, L4 and L6 in the inductor subunit 142. According to the phase relationship of the multiphase parallel-connected power converter, in the converter with M inductor subunits each of which has i coupled inductors, the mutual phase difference within the same inductor subunit is about 360°/i and the mutual phase difference between the inductor subunits is about 360°/(M× i). In this embodiment, i=3 and M=2. Therefore, the mutual phase difference in the same inductor subunit is about 360°/i=120 degrees, and the mutual phase difference between different inductor subunits is about 360°/(M×i)=60 degrees. For example, the phases of L1, L3 and L5 in the same inductor subunit 141 are 0 degrees, 120 degrees and 240 degrees respectively, with a difference of 120 degrees from each other. The phases of L2, L4 and L5 in the inductor subunit 142 are respectively 60 degrees, 180 degrees and 300 degrees, with a mutual difference of 120 degrees. The phase difference between the inductor subunit 121 and the inductor subunit 122 is 60 degrees.

Figure 15A:
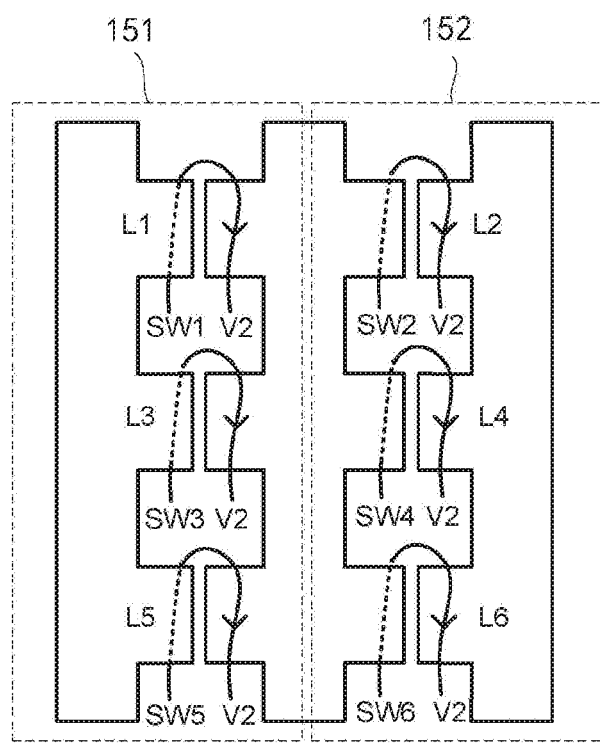
FIG. 15a schematically shows an example of another structure of an integrated inductor unit.
Figure 15B:
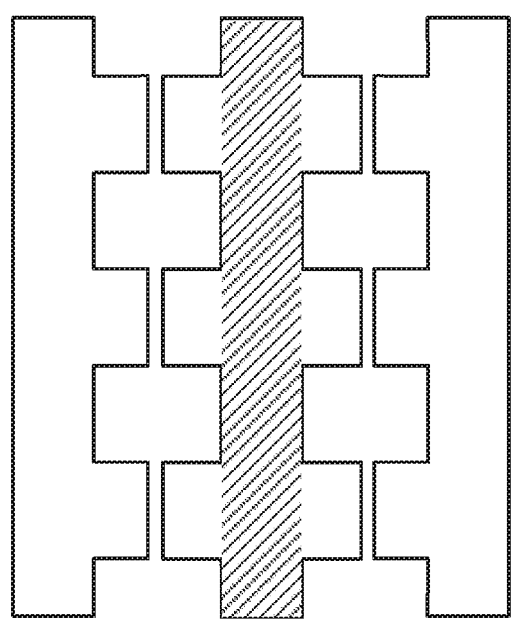

FIG. 15a schematically shows another structure of an integrated inductor unit; FIG. 15b schematically shows the core structure of the integrated inductor unit shown in FIG. 15a; and FIG. 15c schematically shows the magnetic flux distribution of the integrated inductor unit shown in FIG. 15a.

Figure 15C:
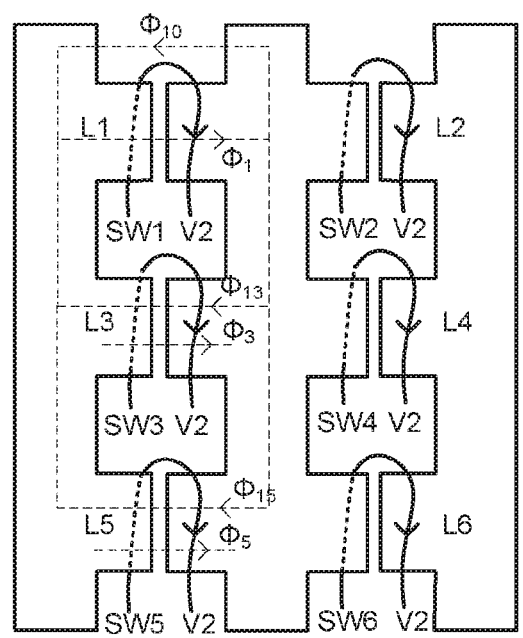

FIGS. 15a to 15c show an exemplary structure of the integrated inductor unit 140 in the converter shown in FIG. 14. The integrated inductor unit includes two inductor subunits 151 and 152, and each inductor subunit has a magnetic core with a ladder-like shape. FIG. 15b also shows the magnetic core structure of the integrated inductor unit. The two inductor subunits share a common portion of the magnetic core, as shown in the shaded part in the drawing, and the common portion does not include an air gap, so as to realize the decoupling between the inductor subunits. FIG. 15c shows the distribution of partial flux when current flows through inductors L1, L3 and L5. In FIG. 15c, $\Phi1$ is the total flux generated by the current in the inductor L1. $\Phi1$ is mainly composed of three parts. $\Phi10$ is the leakage flux of the inductor L1, $\Phi13$ is the mutual flux generated by the inductor L1 and coupled to the inductor L3, and $\Phi15$ is the mutual flux generated by the current in the inductor L1 and coupled to the inductor L5. $\Phi3$ is the total flux generated by the current in the inductor L3, and $\Phi5$ is the total flux produced by the current in the inductor L5. $\Phi13$ and $\Phi3$ have opposite direction, and $\Phi15$ and $\Phi5$ have opposite direction, so L1 is inverse-coupled with L3 and L5. In addition, since there is no air gap in the common magnetic column and there is an air gap in the non-common portion of the inductor subunit 152, the flux generated by the current in the inductor L1 only couples with the inductors L3 and L5 in the same inductor subunit instead of coupling with the inductors (L2, L4 and L6) in the other inductor subunit 152.

Some embodiments of the present disclosure have been described above in detail with reference to the accompanying drawings, in which the converter includes a certain number of phases and/or inductors, however, those skilled in the art should understand that the converter may include other numbers of phases and/or inductors.

According to the embodiments, the inductors in the same inductor subunit are inverse-coupled with each other, and the inductors in different inductor subunits are not coupled with each other. Further, one or more integrated inductor units can be included in the power converter. Therefore, in another embodiment according to the present disclosure, an N-phase inverter includes k integrated inductor units, each of the k integrated inductor units includes M inductor subunits, and each of the inductor subunits includes i inductors. The total number of the phases of the inverters N=k× M×i, the phase difference between the respective phases within the whole integrated inductor unit is about 360°/(M× i), and the phase difference between the respective phases within the inductor subunit is about 360° i. Here, N is a natural number greater than 3, k is a natural number greater than or equal to 1, M is a natural number greater than or equal to 2, and i is a natural number greater than or equal to 2.

To sum up, according to a first aspect of embodiments of the present disclosure, there is provided an N-phase power converter (for example, as shown in FIG. 4), wherein N is a natural number greater than 3 (for example, N=6 as shown in FIG. 4). In the N-phase power converter, the input terminals of each phase are connected in parallel and the output terminals of each phase are connected in parallel. The N-phase power converter includes N switch units and an integrated inductor unit. Each phase of the N-phase power converter has one of the N switch units The integrated inductor unit includes M inductor subunits and M is a natural number greater than or equal to 2 (for example, as shown in FIG. 4, the integrated inductor unit 40 includes inductor subunits 41, 42 and 43, i.e., M=3). Each of the inductor subunits includes i inductors, i is a natural number greater than or equal to 2 (for example, as shown in FIG. 4, the inductor subunit 41 includes inductors L1 and L2, i.e., i=2), and N>M×i or N=M×i. The M×i inductors of the integrated inductor unit are respectively coupled to the M×i of the N switch units. The i inductors of each inductor subunit are inverse-coupled to each other (e.g., as shown in FIG. 4, the two inductors L1 and L2 in the inductor subunit 41 are inverse-coupled to each other). The coupling coefficient between the M inductor subunits is less than the coupling coefficient among the i inductors in each of the inductor subunits (for example, in FIG. 4, the coupling coefficient between the inductor subunits 41, 42 43 is less than the coupling coefficient between the inductors within each inductor subunit).

As shown in FIG. 4, all the inductors of the N-phase power converter may be formed by using at least one integrated inductor unit, where N=M×i. However, the present disclosure is not limited thereto. For example, it is possible that the M×i inductors in the N inductors are integrated into one integrated inductor unit and the remaining (N−M×i) inductors can be implemented in an integrated manner or not. In this case, N≥M×i. The N-phase power converter may also employ two or more integrated inductor units, such as one integrated inductor unit (M inductor subunits, each of which has i inductors) having M×i inductors, and another integrated inductor unit (p inductor subunits, each of which has q inductors) having p×q inductors, then N>(M×i+p×q) or N=(M×i+p×q).

According to an embodiment of the present disclosure, the coupling coefficient between the M inductor subunits is less than 0.2. The magnetic fluxes generated by the i inductors of any one of the inductor subunits do not flow through the i inductors of other inductor subunits. Any one of the inductor subunits shares a common magnetic column with at least one other inductor subunit, and there is no air gap in the common magnetic column (for example, the inductor subunit 51 and the inductor subunit 52 share a common magnetic column having no air gap, as shown in FIG. 5a). The M inductor subunits may be arranged in a row (for example, as shown by the inductor subunits 51, 52 and 53 in FIG. 5a), and the two adjacent inductor subunits share one of the common magnetic columns. The magnetic fluxes generated by the 2×i inductors in the two adjacent inductor subunits all flow through the common magnetic column (for example, as shown in FIG. 5c, the magnetic fluxes generated by the two inductors of the inductor subunits 51 (that is, i=2) all flow through the common magnetic column between the inductor subunit 51 and the inductor subunit 52). Similarly, the magnetic fluxes generated by the two (i=2) inductors of the inductor subunit 52 also flow through the common magnetic column between the inductor subunit 51 and the inductor subunit 52. Thus, the common magnetic column can decouple the flux generated by different inductor subunits.

According to an embodiment of the present disclosure, the inductor subunit includes: i first magnetic columns, coupled to at least one of the common magnetic columns, with i air gaps respectively formed in the i first magnetic columns; and i windings, respectively wound around the i first magnetic columns for forming the i inductors (for example, as shown in FIGS. 5a to 5c, where i=2).

According to one embodiment of the present disclosure, when M×i switch units respectively operate, the direction of the DC magnetic flux generated by the $x_{th}$ winding of the i windings in the $x_{th}$ first magnetic column wound by the $x_{th}$ winding is opposite to the direction of the DC magnetic fluxes generated by the other i−1 windings of the same inductor subunit in the $x_{th}$ first magnetic column (for example, as shown in FIG. 5c, the direction of the DC magnetic flux generated by the winding of the inductor L1 in the $1_{st}$ first magnetic column wound by the winding of the inductor L1 is opposite to the direction of the DC magnetic flux generated by the winding of the inductor L2 in the $1_{st}$ first magnetic column).

According to one embodiment of the disclosure, the i windings respectively cover the i air gaps.

According to an embodiment of the present disclosure, the inductor subunit further includes a second magnetic column. The second magnetic column is coupled to at least one of the common magnetic columns and has an air gap, and the second magnetic column has no windings around it (For example, as shown in FIG. 7a, the inductor subunit 71 includes a magnetic column without a winding).

According to an embodiment of the present disclosure, each of the inductor subunits includes (for example, see FIGS. 9 a and 9b): a third magnetic column having an air gap thereon; and an first winding and a second winding, wound around the third magnetic column to form two of the i inductors; wherein when the M×i switch units are respectively operated, the direction of the direct current flux generated by the first winding in the third magnetic column is opposite to the direction of the direct current flux generated by the second winding in the third magnetic column. That is, in FIG. 9b, direction of Φ1 is opposite to direction of Φ4 in the magnetic column there they are wound on.

According to one embodiment of the present disclosure, the third magnetic column and at least one of the common magnetic columns are coupled to each other (for example, are vertically coupled to each other), and the number of the inductors in the inductor subunit i equals to 2 (for example, as shown in FIG. 9a and FIG. 9b).

According to an embodiment of the present disclosure, the third magnetic column and the common magnetic column are arranged parallel to each other and are arranged alternately, and the number of the inductors in the inductor subunit i equals to 2 (for example, as shown in FIG. 11a and FIG. 11b).

According to one embodiment of the present disclosure, the direct current flux generated by the $x_t$ inductor of the i inductors of any one inductor subunit flows through the other i−1 inductors of this inductor subunit, and the direct current flux generated by the $x_{th}$ inductor flows through the $x_{th}$ inductor in a direction which is opposite to the direction in which the direct current generated by the other i−1 inductors of this inductor subunits flows through the $x_{th}$ inductor, and the direct current flux generated by the $x_{th}$ inductor does not flow through the other inductor subunits (for example, as shown in FIG. 15 a and FIG. 15C, the inductor subunit 151 has three (i.e., i=3) inductors L1, L3 and L5. The direct current flux generated by the second (i.e., x=2) inductor L3 flows through the other two inductors L1 and L5 of this inductor subunit, and the direct current flux generated by the second inductor L3 in the magnetic column where L3 is wound on has a direction which is opposite to the direction in which the direct current flux generated by the other two inductors L1 and L5 flows through the magnetic column where L3 is wound on. That is, in FIG. 15c, direction of Φ3 is opposite to direction of Φ13. The direct current flux generated by the L3 does not flow through the inductors L2, L4 and L6 in the inductor subunit 152).

According to an embodiment of the present disclosure, the integrated inductor unit is composed of the M inductor subunits, and each of the inductor subunits is composed of the i inductors. The M×i inductors of the integrated inductor unit has phase difference of 360°/(M×i), and the i inductors of any one of the inductor subunits has phase difference of 360°/i.

According to an embodiment of the present disclosure, the number of integrated inductor units is k, where k is a natural number greater than 1, and the N=k×M×i (for example, when there are 2 (k=2) integrated inductor unit 40 as shown in FIG. 4 (where M=3, i=2), the power converter may have 12 phases (i.e., N=2×3×2) or more).

According to one embodiment of the present disclosure, for example, as shown in FIG. 12, each of the M inductor subunits (e.g., inductor subunits 121, 122, 123) includes a third magnetic column, a third winding and a fourth winding. The third magnetic column has an air gap, the third winding and the fourth winding are wound around the third magnetic column to form i inductors in the inductor subunit. Wherein i equals to 2, and the third magnetic columns of the M inductor subunits are arranged parallel to each other. The integrated inductor unit further comprises at least one decoupling magnetic column (for example, see the shaded part of the column in FIG. 12), which has no air gap and no winding. The decoupling magnetic column and the third magnetic column are arranged in parallel.

According to a second aspect of the embodiments of the present disclosure, there is provided an N-phase integrated inductor element in which N is a natural number greater than 3. The integrated inductor element includes M inductor subunits, and M is an integer greater than or equal to 2. Each inductor subunit comprises at least i inductors, wherein i is a natural number greater than or equal to 2, and N>M×i or N=M×i. Wherein: the i inductors of the same inductor subunit are coupled with each other, and the coupling coefficient between the M inductor subunits is less than the coupling coefficient between the i inductors within the inductor subunit.

According to one embodiment of the present disclosure, the M inductor subunits are not coupled.

According to one embodiment of the disclosure, the end of the common magnetic column extends beyond the all the i first magnetic columns, as shown by the end 57 in FIG. 5*b*.

According to one embodiment of the present disclosure, the thickness of the third magnetic column is less than the thickness of the common magnetic column as shown in FIG. 10*a* to FIG. 10*e* (h1<h2), and both the first winding and the second winding are U-shaped windings and have two terminal surface on the same plane as pads to connect.

According to a third aspect of the present disclosure, there is provided a control method of phase shedding for an N-phase power converter according to other aspects of the present disclosure. The control method comprises: controlling the y×i switch units coupled with the y×i inductors of the y inductor subunits in the M inductor subunits to be turned off, wherein 0<y<M, so as to shed the y×i inductors of y inductor subunits; and controlling the (M−y)×i inductors of the other M−y inductor subunits to have a phase difference of 360°/[(M−y)×i].

According to an embodiment of the present disclosure, the control method of phase shedding further includes: when y=M−1, controlling the s switch units coupled with the s inductors of the inductor subunits which are not shed to be turned off, wherein 0<s<i; and controlling the phase difference of the other i−s inductors to be 360°/(i−s).

The power converters, inductor elements and control method of phase shedding disclosed in the present disclosure may have at least one of the following three advantages: First, the inductors of the same inductor subunit are inverse-coupled with each other. Compared with the uncoupled or the positive coupled schemes, the inverse-coupling scheme can achieve lower ripple current and lower dynamic inductance. At the same time, since the direct current fluxes are at least partially cancelled with each other, the saturation characteristics of the inductor will be significantly increased. Second, the control mode of "phase shedding" could further achieve "subunit shedding" in order to achieve the best efficiency throughout the entire load range when the load changes. For example, from heavy load to light load, the controller will shed each of the inductor subunits one by one to enhance the light load efficiency of the entire converter. However, since the inductor subunits are not coupled to each other, shedding the corresponding inductor subunit will not affect the saturation characteristics of the inductor and the dynamic performance of the inductor, which has advantages over the conversional reverse coupled inductors. Last, the magnetic column between the inductor subunits is shared by two adjacent inductor subunits and thus has a smaller core volume compared with the discrete inductors, which can increase the power density of the entire converter.

Other embodiments of the present disclosure will readily occur to those skilled in the art upon consideration of the specification and practice of the disclosures disclosed herein. This application is intended to cover any variations, uses, or adaptations of the disclosure that follow the general principles of the disclosure and include what is generally known in the art, which is not disclosed in this disclosure, or is dependent on conventional techniques. It is intended that the specification and examples be considered as exemplary only, with the true scope and spirit of the disclosure being indicated by the following claims.

It should be understood that the present disclosure is not limited to the precise structures that have been described above and shown in the drawings, and that various modifications and changes may be made without departing from the scope thereof. The scope of the disclosure is limited only by the accompanying claims.

What is claimed is:

1. An N-phase power converter, wherein N is a natural number greater than 3, inputs of each phase of the N-phase power converter are connected in parallel, outputs of each phase of the N-phase power converter are connected in parallel, and the N-phase power converter comprises:
   N switch units, wherein each phase of the N-phase power converter comprises one of the N switch units; and
   an integrated inductor unit, comprising M inductor subunits, wherein M is a natural number greater than or equal to 2, each of the M inductor subunits comprises i inductors, i is a natural number equal to 2, N>M×i or N=M×i, and the M×i inductors in the integrated inductor unit are respectively coupled to M×i of the N switch units,
   wherein the i inductors of the same inductor subunit are inverse-coupled to each other, and a coupling coefficient between the M inductor subunits is less than a coupling coefficient between the i inductors in the same inductor subunit, and
   wherein each of the M inductor subunits comprises a first magnetic column, a first winding and a second winding, the first magnetic column has an air gap, the first winding and the second winding are wound around the first magnetic column to form the i inductors in the inductor subunit, wherein i equals to 2, the first magnetic column of the M inductor subunits are arranged in parallel with each other, wherein the integrated inductor unit further comprises at least one decoupling magnetic column, the decoupling magnetic column has no air gap, the decoupling magnetic column does not have winding, the decoupling magnetic column is arranged in parallel with the first magnetic column, and the first magnetic column is coupled to the at least one of the decoupling magnetic column.

2. The N-phase power converter of claim 1, wherein the coupling coefficient between the M inductor subunits is less than 0.2.

3. The N-phase power converter of claim 1, wherein magnetic fluxes generated by the i inductors of any one of the inductor subunits do not flow through the i inductors of other inductor subunits.

4. The N-phase power converter of claim 1, wherein,
a direct current magnetic flux generated by an $x_{th}$ one of the i inductors of any one of the inductor subunits flows through other i−1 inductors of the same inductor subunit, a direction of the direct current flux flowing through the $x_{th}$ inductor generated by the $x_{th}$ one of the i inductors is opposite to a direction of direct current fluxes flowing through the $x_{th}$ inductor generated by the other i−1 inductors of the same inductor subunit, and a direct current flux generated by the $x_{th}$ inductor does not flow through other inductor subunits.

5. The N-phase power converter of claim 1, wherein the integrated inductor unit is composed of the M inductor subunits, each of the inductor subunits is composed of the i inductors, the M×i inductors of the integrated inductor unit are phase difference with each other by 360°/(M×i), and the i inductors of any one of the inductor subunits are phase difference with each other by 360°/i.

6. The N-phase power converter of claim 1, wherein a number of the integrated inductor units is k, wherein k is a natural number greater than 1, and N=k×m×i.

7. The N-phase power converter of claim 1, wherein the first magnetic column and the decoupling magnetic column are formed in a same plane.

8. A control method of phase shedding for an N-phase power converter of claim 1, the control method of phase shedding comprising:

controlling y×i switch units coupled with y×i inductors of y inductor subunits in the M inductor subunits to be turned off, wherein 0<y<M, so as to shed the y inductor subunits; and controlling (M−y)×i inductors of other M−y inductor subunits to have a phase difference of 360°/[(M−y)×i].

9. The inductor cut control method of claim 8, further comprising:
when y=M−1, controlling s switch units coupled with s inductors which are not shed in the inductor subunit to be turned off, wherein 0<s<i; and
controlling the phase difference of other (i−s) inductors to be 360°/(i−s).

10. An N-phase integrated inductor element, wherein N is a natural number greater than 3, the integrated inductor element comprises M inductor subunits, M is a natural number greater than or equal to 2, each of the M inductor subunit comprises at least i inductors, i is a natural number equal to 2, and N>M×i or N=M×i, wherein:

the i inductors of the same inductor subunit are coupled to each other, a coupling coefficient between the M inductor subunits is less than a coupling coefficient between the i inductors within the same inductor subunit, wherein each of the M inductor subunits comprises a first magnetic column, a first winding and a second winding, the first magnetic column has an air gap, the first winding and the second winding are wound around the first magnetic column to form the i inductors in the inductor subunit, wherein i equals to 2, the first magnetic column of the M inductor subunits are arranged in parallel with each other, wherein the integrated inductor unit further comprises at least one decoupling magnetic column, the decoupling magnetic column has no air gap, the decoupling magnetic column does not have winding, the decoupling magnetic column is arranged in parallel with the first magnetic column, and the first magnetic column is coupled to the at least one of the decoupling magnetic column.

11. The N-phase integrated inductor element of claim 10, wherein the coupling coefficient between the M inductor subunits is less than 0.2.

12. The N-phase integrated inductor element of claim 10, wherein the first magnetic column and the decoupling magnetic column are formed in a same plane.

* * * * *